United States Patent
Zerbe et al.

(10) Patent No.: US 12,067,188 B2
(45) Date of Patent: Aug. 20, 2024

(54) SYSTEMS, METHODS AND APPARATUS FOR THROUGH SKIN COMMUNICATION AND NOISE DISAMBIGUATION

(71) Applicant: Apple Inc., Cupertino, CA (US)

(72) Inventors: Jared L. Zerbe, Woodside, CA (US); Brian H. Tsang, Belmont, CA (US); Timothy M. Johnson, Sarasota, FL (US); Bryan D. Raines, Campbell, CA (US); Zaid M. Nadeem, Sunnyvale, CA (US); Andy J. Zhou, Redwood City, CA (US); Xinhao Wang, Urbana, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/319,223

(22) Filed: May 17, 2023

(65) Prior Publication Data

US 2023/0376151 A1    Nov. 23, 2023

Related U.S. Application Data

(60) Provisional application No. 63/365,022, filed on May 19, 2022.

(51) Int. Cl.
*G06F 3/041* (2006.01)
(52) U.S. Cl.
CPC ................................ *G06F 3/0416* (2013.01)
(58) Field of Classification Search
CPC .................................................... G06F 3/0416
See application file for complete search history.

(56) References Cited

U.S. PATENT DOCUMENTS

| | | | |
|---|---|---|---|
| 6,507,662 B1 | 1/2003 | Brooks | |
| 9,641,261 B2* | 5/2017 | Ying | G06F 1/163 |
| 9,881,273 B2 | 1/2018 | Yang et al. | |
| 10,276,127 B2 | 4/2019 | Cherkashin et al. | |
| 10,924,472 B2 | 2/2021 | He et al. | |
| 2015/0160731 A1* | 6/2015 | Yun | G06F 1/163 |
| | | | 715/740 |
| 2016/0070897 A1 | 3/2016 | Lu et al. | |
| 2021/0303068 A1* | 9/2021 | Beyhs | G06F 1/163 |
| 2021/0303069 A1* | 9/2021 | Beyhs | G06F 3/017 |

OTHER PUBLICATIONS

Das et al., "Enabling Covert Body Area Network Using Electro-Quasistatic Human Body Communication", Scientific Reports, vol. 9, No. 4160, Mar. 11, 2019, 14 pages.

(Continued)

*Primary Examiner* — Gene W Lee
(74) *Attorney, Agent, or Firm* — Kubota & Basol LLP

(57) ABSTRACT

Sensing circuitry of a first electronic device can be configured to sense a signal transmitted by the second, external electronic device contacting and coupling through the body of the user. The first electronic device can be configured to detect the contact while receiving data from the second device, and determine whether the signal transmitted by the external device corresponds an "intentional touch," or corresponds to a signal coupling between a different body part and the external device or through a different signal pathway (e.g., electromagnetically, through the air, etc.).

20 Claims, 8 Drawing Sheets

(56) References Cited

OTHER PUBLICATIONS

Laput et al., "EM-Sense: Touch Recognition of Uninstrumented, Electrical and Electromechanical Objects", UIST '15, Nov. 8-11, Charlotte, NC, USA, 2015, 10 pages.

Li et al., "A Differential Analog Receiver Front-End for Galvanic-Coupled Human Body Communication", IEEE Instrumentation and Measurement Society, 2020, 5 pages.

Maity et al., "Bio-Physical Modeling, Characterization, and Optimization of Electro-Quasistatic Human Body Communication", IEEE Transactions On Biomedical Engineering, vol. 66, No. 6, Jun. 2019, pp. 1791-1802.

Nath et al., "Inter-Body Coupling in Electro-Quasistatic Body Communication: Theory and Analysis Security and Interference Properties", Scientific Reports, Mar. 30, 2020, 13 pages.

Sato et al., "Touche: Enhancing Touch Interaction on Humans, Screens, Liquids, and Everyday Objects", CHI 2012, May 5-10, 2012, Austin, TX, USA, 2012, 10 pages.

Whitney, Lance, "How to Unlock Your iPhone and Mac With an Apple Watch", PCMag, Available online at: <https://www.pcmag.com/how-to/unlock-iphone-mac-with-apple-watch>, [retrieved on Mar. 19, 2024], Apr. 30, 2021, 15 pages.

Zhang et al., "SkinTrack: Using the Body as an Electrical Waveguide for Continuous Finger Tracking on the Skin", CHI'16, May 7-12, 2016, San Jose, CA, USA, 2016, 13 pages.

Zhao et al., "A Review on Human Body Communication: Signal Propagation Model, Communication Performance, and Experimental Issues", Hindawi, Wireless Communications and Mobile Computing, vol. 2017, Article ID 5842310, Oct. 22, 2017, 15 pages.

Zhao et al., "An Auto Loss Compensation System for Capacitive-Coupled Body Channel Communication", IEEE Transactions on Biomedical Circuits and Systems, vol. 13, No. 4, Aug. 2019, pp. 756-765.

Zimmerman, Thomas G., "Personal Area Networks (PAN): Near-Field Intra-Body Communication", B.S., Humanities and Engineering Massachusetts Institute of Technology, Feb. 1980, 81 pages.

\* cited by examiner

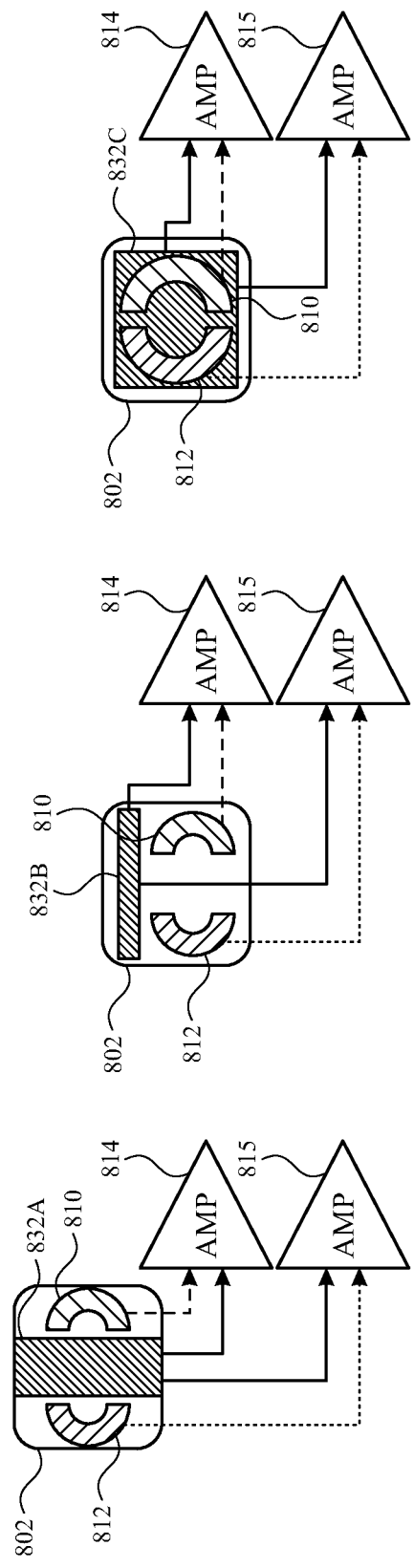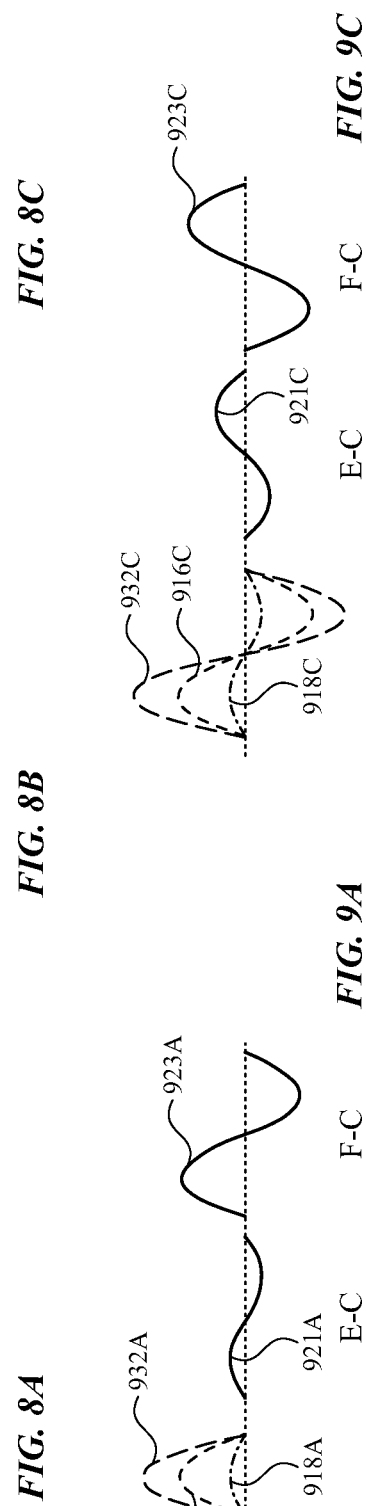

SYSTEMS, METHODS AND APPARATUS FOR THROUGH SKIN COMMUNICATION AND NOISE DISAMBIGUATION

CROSS-REFERENCE TO RELATED APPLICATIONS

This application claims the benefit of U.S. Provisional Application No. 63/365,022, filed May 19, 2022, the content of which is incorporated herein by reference in its entirety for all purposes.

FIELD OF THE DISCLOSURE

This relates generally to systems and methods of detecting and disambiguating touch of a user on an electronic device, and more particularly, to determining if touch is intentional and performed by a part of the body corresponding to the user of a wearable device.

BACKGROUND OF THE DISCLOSURE

Many types of input devices are presently available for performing human computer interfacing with a computing system, such as buttons or keys, mice, trackballs, joysticks, touch sensor panels, touch screens, and the like. In some examples, electronic devices can be configured to detect touch of a user. The detection of touch, however, can be sensitive to false positives caused by signals unintentionally coupling a device. Therefore, a system that can reliably detect contact and disambiguate intentional touch events of a user is desired.

SUMMARY OF THE DISCLOSURE

This relates to devices and methods of detecting contact between a body part of a user and an external device. Sensing circuitry of a first electronic device can be configured to sense a signal transmitted by the second, external electronic device coupling through the body part of the user. Processing circuitry of the first electronic device can be configured to detect the contact, and determine whether the signal transmitted by the external device corresponds to a signal coupling between the body part (e.g., a finger) and the external device, referred to herein as an "intentional touch," or corresponds to a signal coupling between a different body part and the external device or through a different signal pathway (e.g., electromagnetically, through the air, etc.), referred to herein as an "unintentional touch." The processing circuitry can make such a determination by evaluating one or more criteria. In some examples, the criteria can include evaluating amplitude and phase characteristics of signals received by the sensing circuitry.

In some examples, the wearable device can include two or more electrodes and be configured to detect an active touch event where a signal couples through the body part of the user. In some examples, the two or more electrodes can be coupled to the skin via galvanic or capacitive connection. In some examples, measurements from the two electrodes can be used to generate a differential measurement. In some examples, external device can emit one or more waveforms (e.g., into a conductive surface or touch surface of the device), optionally including first waveform and a second waveform. In some examples, the first waveform can be a periodic waveform and the second waveform can include one or more impulses. In some examples, the wearable device can determine characteristics of the differential measurements generated in response to the first waveforms meet the one or more criteria and perform or forgo performance of one or more functions of the wearable device. In some examples, the one or functions can include data communication from the external device to the wearable device during or following the differential measurements.

In some examples, the first waveform can be used to determine timing information of associated with the second waveform. In some examples, the wearable device can apply computational techniques (e.g., Goertzel algorithms, signal processing, and/or machine learning techniques) to improve confidence in results when evaluating the one or more criteria. In some examples, the wearable device can repeat and aggregate (e.g., average) measurements (e.g., differential measurements). Such repetition and aggregation can increase the signal-to-noise ratio (SNR) of signals received by the wearable device (e.g., improving data communication between the external and wearable devices).

In some examples, the wearable device can include three electrodes and be configured to detect the contact. In some examples, one of the three electrodes can be configured to couple to interfering signals or other signals (e.g., reference signals) which may introduce noise (e.g., common mode noise) to the electrodes. In some examples, the wearable device including one or more sensors other than electrodes can improve confidence in determining the contact using the one or more sensors.

BRIEF DESCRIPTION OF THE DRAWINGS

FIGS. 8A-8C illustrate configurations of a wearable device including three electrodes according to examples of the disclosure.

FIGS. 9A-9D illustrate example waveforms associated with sensing circuitry of a wearable device according to examples of the disclosure.

DETAILED DESCRIPTION

Figure 1B:
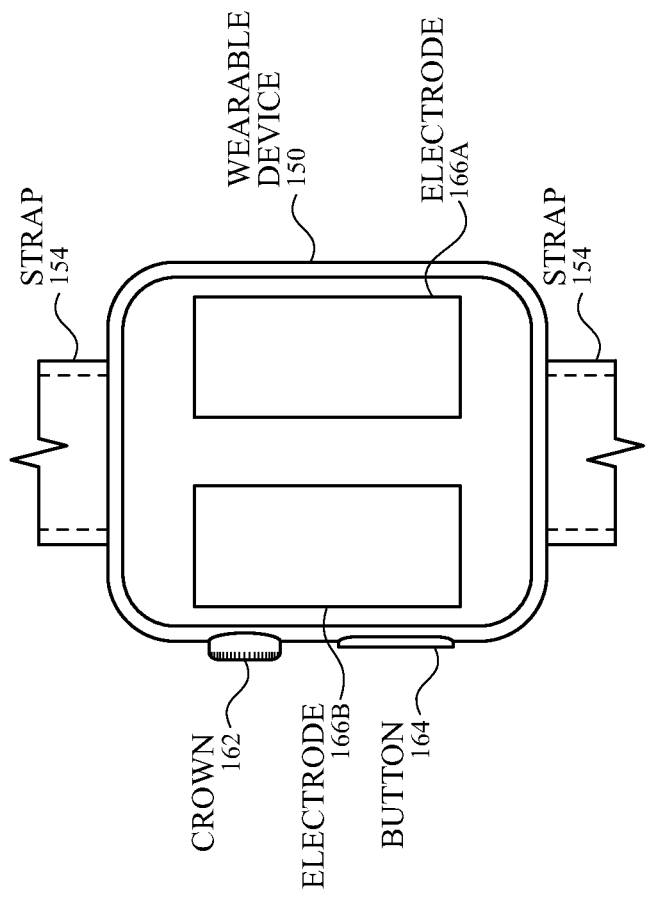
FIGS. 1A and 1B illustrate an example system for contact detection according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to devices and methods of detecting contact between a body part of a user and an external device. Sensing circuitry of a first electronic device can be configured to sense a signal transmitted by the second, external electronic device coupling through the body of the user. Processing circuitry of the first electronic device can be configured to detect the contact, and determine whether the signal transmitted by the external device corresponds to a signal coupling between the body part and the external device, referred to herein as an "intentional touch," or corresponds to a signal coupling between a different body part and the external device or through a different signal pathway (e.g., electromagnetically, through the air, etc.), referred to herein as an "unintentional touch." It is understood that an "intentional touch" corresponds to a touch from a body part designated for such contact inputs for interaction with an external device, irrespective of whether the touch by the body part is intentional or not. Additionally, it is understood that "unintentional touch" corresponds to touch from other body parts not designated for such contact inputs for interaction with an external device, irrespective of whether the touch by the other body parts is intentional or not, and may also refer to a lack of touch (e.g., from a signal pathway not through the body, in which there is no touch at all). The processing circuitry can make such a determination by evaluating one or more criteria. In some examples, the criteria can include evaluating amplitude and phase characteristics of signals received by the sensing circuitry.

In some examples, the first device is a wearable device, and can include two electrodes and be configured to detect an active touch event where a signal couples through the body part of the user. In some examples, measurements from the two electrodes can be used to generate a differential measurement. In some examples, external device can transmit one or more waveforms, optionally including first waveform and a second waveform. In some examples, the first waveform can be a periodic waveform and the second waveform can include one or more impulses. In some examples, the second waveform can comprise the same or higher frequencies as the first waveform. In some examples, the wearable device can determine characteristics of the differential measurements generated in response to the first waveforms meet the one or more criteria and perform or forgo performance of one or more functions of the wearable device.

In some examples, the first waveform can be used to determine timing information associated with the second waveform. In some examples, the wearable device can apply computational techniques (e.g., Goertzel algorithms, machine learning techniques) to improve confidence in results when evaluating the one or more criteria. In some examples, the wearable device can repeat and aggregate measurements by means of measuring repeated frequency bursts and impulse waveforms, and averaging the results of the repeated waveform to improve the signal to noise ratio.

In some examples, the wearable device can include three electrodes and be configured to detect the contact. In some examples, one of the three electrodes can be configured to couple to interfering signals and/or signals coupling to the other two electrodes (e.g., noise that is in-common with the other two electrodes). In some examples, the wearable device including one or more sensors other than electrodes can improve confidence in determining the contact using the one or more sensors. In some examples, the confidence of data transmission can be improved using the configurations described herein.

Figure 1A:
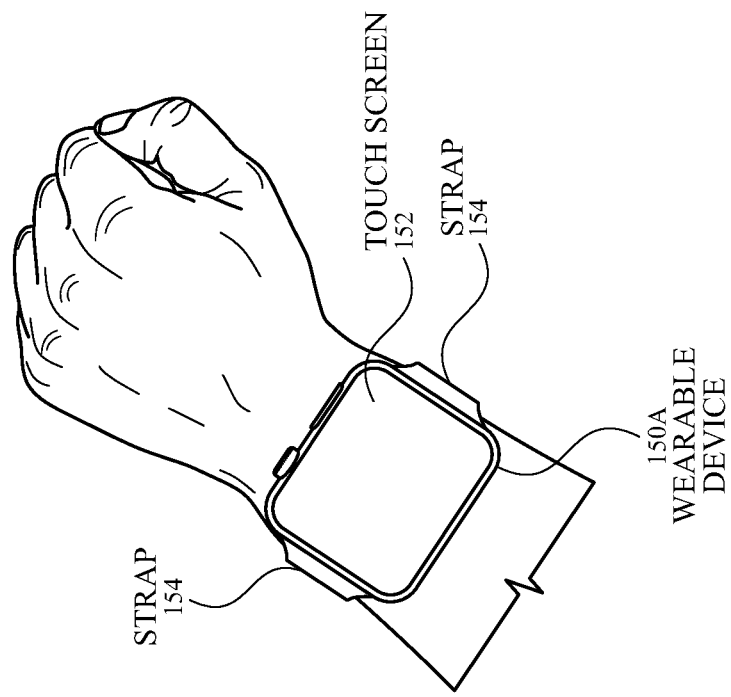

FIGS. 1A and 1B illustrate an example system for contact detection according to examples of the disclosure. FIG. 1A illustrates a system including a wrist-worn wearable device 150A including at least two electrodes configured to establish electrical contact between the wearable device and the wearer's skin. The electrical contact optionally includes galvanic, capacitive, and/or other methods of contact. The electrodes included in the wrist-worn wearable device can couple to sensing circuitry included in the wrist-worn wearable device, which can be configured to measure signals coupled to the electrodes. Processing circuitry included in the wrist-worn wearable device can use measurements of the signals at the respective electrodes to detect contact between the user's body and an external electrical device and optionally communicate data. In some examples, one or more criteria can be evaluated using characteristics of the measurements to determine if the signals at the respective electrodes corresponds to a touch event where a body part (e.g., a hand) closest to the wearable device (e.g., wrist-worn) contacts a different, external device configured to transmit a signal that propagates through the hand towards the wrist-worn wearable device. In some examples the signal can propagate through a finger making intentional contact.

In some examples, as illustrated in FIG. 1A, the wearable device 150A can be a watch (optionally including crown 162 and/or button 164) that can each be fastened to a user via strap 154 or any other suitable fastener. Wearable device 150A can include a touch screen 152. It is understood that although wearable device 150A is illustrated as including a touch screen 152, contact detection can be achieved without a touch screen or display integrated with wearable device 150A. For example, FIG. 1B illustrates a backside of wearable device 150 with two electrodes 166A-166B, though more electrodes are possible. For example, some wearable devices can include two electrodes (e.g., as described with reference to FIG. 4) or three electrodes (e.g., as described with reference to FIGS. 8A-8C), etc. It should be understood that although FIGS. 1A-1B illustrate two views of a single wearable device 150, that the components described herein can be divided among multiple devices (e.g., two co-located wearables, sensing circuitry in the wearable device and processing circuitry in another device such as a smart phone, etc.). For example, the control of the sensing circuitry and/or the processing of the signals received by the sensing circuitry distributed between multiple devices can be enabled based on wired or wireless communication between the multiple devices. In some examples the sensing circuitry can be distributed throughout a housing, band, and/or other components of the wearable device. It should be understood that wearable device 150 can include all of the components above, fewer components, and/or different components. It should be understood that although wearable device 150 is illustrated as a wrist-worn watch in FIGS. 1A-1B, that different wearable devices can be used and/or different placement of the devices against the body is possible (e.g., ring, wrist band, arm band, ankle band, chest strap, head band, glove, finger cuff, bracelet, necklace, head-mounted device, headphones, ear buds, etc.). Although primarily described as a wearable device, in some examples, the device can be a non-wearable device in contact with the user (e.g., a handheld controller, a smartphone, a tablet, etc.).

Figure 2:
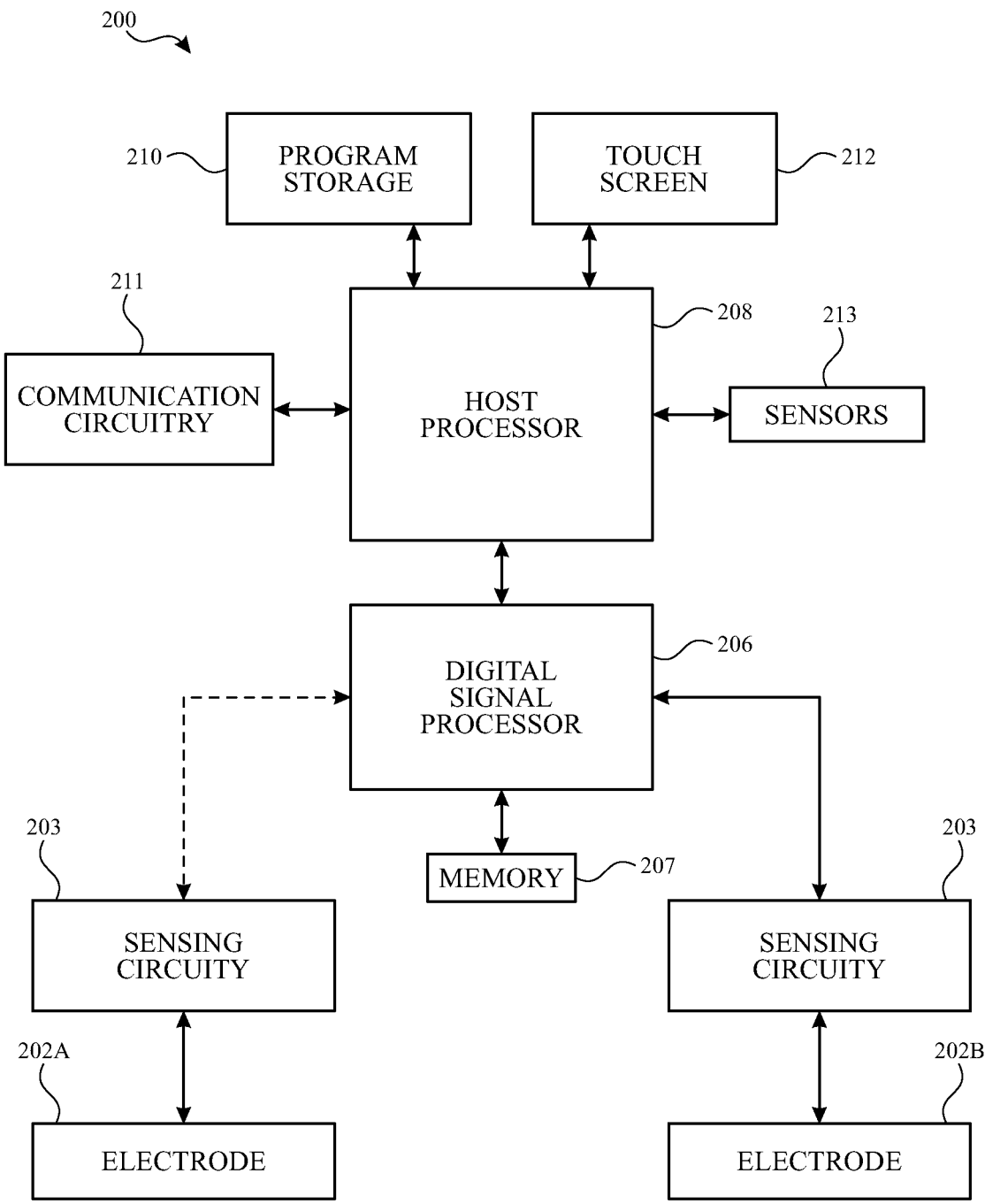
FIG. 2 illustrates a block diagram of an example computing system implementing contact detection according to examples of the disclosure.

FIG. 2 illustrates a block diagram of an example computing system 200 implementing contact detection according to examples of the disclosure. Computing system 200 can include electrodes 202A-202B and sensing circuitry 203 configured to measure sensed signals from a first body part (e.g., a hand closest to the computing system). In some examples, an external device (e.g., device 304 illustrated in FIG. 3) configured to communicate with the computing system 200. For example, computing system 200 can include communication circuitry 211 and the external device can include communication circuitry (e.g., similar to communication circuitry 211) to enable communication between the two devices. The external device can also include drive circuitry, which can include a voltage source or current source to generate the optionally modulated stimulation signal that can provide an alternative means of communication from communication circuitry 211. In some examples, the stimulation signal can include a periodic waveform (e.g., square waveform, sinusoidal waveform, sawtooth waveform, etc.). In some examples, the stimulation signal can have a frequency greater than 500 kHz. In some examples, the stimulation signal can be between 1 MHz and 10 MHz. It is understood that other stimulation signals are possible including non-periodic waveforms at a different frequency or in a different frequency range. As described herein, in some examples, the stimulation signal can include one or more bursts and one or more tones. In some examples, the presence or absence of bursts or tones and/or variations in frequency and/or phase can be used to transmit data (e.g., encoded in the amplitude, frequency or phase modulation of the bursts or tones). In some examples, the sensing circuitry 203 can include one or more amplifiers with a feedback network (e.g., resistors and/or capacitors) between the input(s) and output(s) of the amplifier). In some examples, the one or more amplifiers can include one or more single-ended amplifiers with the inverting input of a first single-ended amplifier coupled to a first sense electrode 202A and the non-inverting input coupled to a reference electrode (e.g., a ground electrode or a floating electrode) and with the inverting input of a second single-ended amplifier coupled to a second sense electrode 202B and the non-inverting input coupled to a reference electrode (e.g., a ground electrode or a floating electrode). The outputs of the first and second single-ended amplifiers can be used for a differential measurement (in the analog or digital domain). In some examples, the one or more amplifiers can include a single differential amplifier with the inverting input coupled to a first sense electrode 202A and the non-inverting input coupled to a second sense electrode 202B. In some examples, system 200 can include a ground electrode (not shown). In some examples, the ground electrode can be located between sense electrode 202A and sense electrode 202B. In some examples, the sensing circuitry can include multiple amplifiers to sense signals received via multiple sense electrodes (in a single-ended or differential manner). In some examples, sensing circuitry 203 can include one or more filters, switches, and/or other components configured to condition received signals for processing. It is understood that although sensing circuitry 203 is represented separately for electrodes 202A-202B that the sensing circuitry can be implemented as one component in the computing system.

Additionally, computing system 200 can include a digital signal processor (DSP) 206 to analyze and process the sensed signals, and optionally memory 207 to store the data from sensing circuitry 203 and/or store configuration data or instructions for DSP 206. In some examples, computing system 200 can also include host processor 208, program storage 210 and touch screen 212 (or other display) to perform display or other operations including contact detection and disambiguation described herein and/or other operations in response to contact with an external device. In some examples, computing system 200 (e.g., corresponding to wearable device 150) can include one or more sensors 213 (e.g., accelerometers, gyroscopes, proximity sensors, inertial measurement units, cameras, etc.) configured to facilitate contact detection and disambiguation as described herein (e.g., with reference to FIG. 10).

Host processor 208 can be connected to program storage 210 to execute instructions stored in program storage 210 (e.g., a non-transitory computer-readable storage medium). Host processor 208 can, for example, provide control and data signals to generate a display image on touch screen 212 (or other display devices), such as a display image of a user interface (UI). Host processor 208 can also receive outputs from DSP 206 (e.g., detection of contact with an external device and/or gestures as touch input) and perform actions based on the outputs (e.g., selection of content or scroll content, etc.). Host processor 208 can also receive outputs (touch input) from touch screen 212 (or a touch controller, not shown). The input (e.g., touch input from touch screen 212 or contact with an external device from DSP 206) can be used by computer programs stored in program storage 210 to perform actions. The actions can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 208 can also perform additional functions that may not be related to touch processing and display.

Note that one or more of the functions described herein, including the analysis and processing of sensed signals for contact detection, can be performed by firmware stored in memory 207 and executed by one or more processors (e.g., in DSP 206), or stored in program storage 210 and executed by host processor 208. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 200 is not limited to the components and configuration of FIG. 2, but can include other or additional components (or omit components) in multiple configurations according to various examples. For example, an analog-to-digital converter (ADC) may be included as part of the sensing circuitry 203 or between sensing circuitry 203 and DSP 206 to convert the signals to the digital domain from the analog domain. As another example, touchscreen 212 can be omitted and the input information from the analysis and processing by DSP 206 can be relayed to another device (e.g., a tablet, laptop, smartphone, computer, server, etc.) via wired or wireless connection that can include a display. Additionally, the components of computing system 200 can be included within a single device (e.g., as illustrated in and described with reference to FIG. 1A), or duplicated in part or in whole in multiple devices in a system, or can be distributed between multiple devices. In some examples, sensing circuitry 203 can be separated from the electrodes such that the sensing circuitry can be implemented in a device worn on the wrist (or a first part of the body, generally) and the electrodes can be worn on or near the fingers.

Referring back to sensing circuitry 203, sensing circuitry 203 can measure sensed signals and can be in communication with DSP 206 to provide the sensed signals to DSP 206. In some examples, the sensed signals can be stored in memory 207 (e.g., acting as a data buffer) and the DSP 206 can acquire a buffered sample of the sensed signal waveform for further processing, analysis, and/or data transmission and reception as described herein. In some examples, memory 207 can be implemented as part of DSP 206. It should be understood that although a DSP is described, other processing circuits could be used to implement the analysis and processing described herein including a microprocessor, central processing unit (CPU), programmable logic device (PLD), and/or the like.

Figure 3:
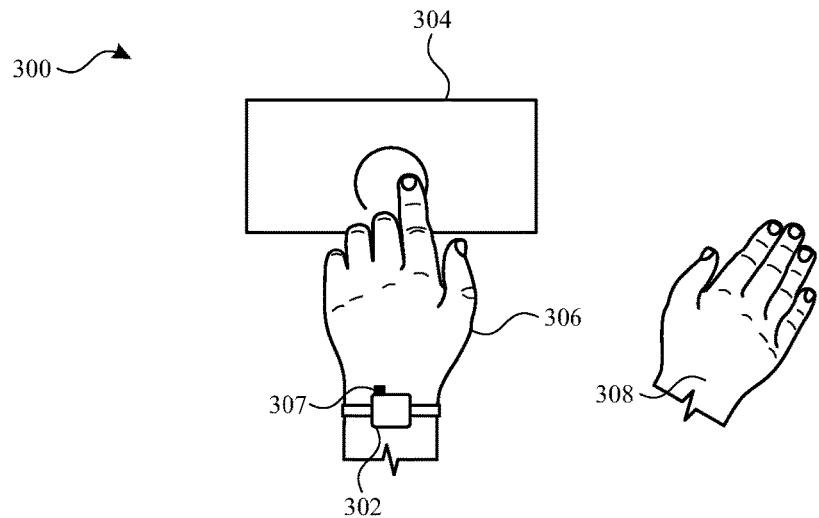
FIG. 3 illustrates a contact between a first body part and an external device according to examples of the disclosure.

FIG. 3 illustrates a contact between a first body part of a user wearing a wearable device and an external device according to examples of the disclosure. A system 300 including wearable device 302, for example, can be a wrist-worn device closest to an active hand 306 configured to detect contact of active hand 306 with an external device 304. The configuration of electrodes of a wearable electronic device and the placement of the wearable electronic device can be used to differentiate contact between body parts on a first side of the wearable electronic device (e.g., active hand 306 or a portion of the hand used to make contact) and body parts on a second, opposite side of the wearable electronic device (e.g., passive hand 308, an elbow, or another portion of the body closest to the opposite side of the wearable electronic device). It is understood that references to sides of the wearable device (e.g., the first side and the opposite side) can be defined relative to aspects of the wearable device. For example, an imaginary bisection of a wrist-worn wearable device can be drawn parallel to the width of a user's wrist, where areas in space or of a user's body closest to a first half of the wearable device can correspond to the previously described first side (e.g., closest to crown 307), and areas closest to the second half of the wearable device can correspond to the opposite side (e.g., further away from crown 307). The first and opposite sides can also be defined relative to the periphery of the wearable device housing or relative to the locations of two respective electrodes of the wearable device. For example, the first side can correspond to areas closest to a first edge, face, and/or electrode of a wearable device shaped similarly to a rectangular prism, and the opposite side can correspond to areas closest to a second edge, face, and/or electrode of the wearable device opposite of the first edge or face. In some examples, the first side can be an edge of the wearable device that includes crown 307, and the second side can be an opposite edge of the wearable device that does not include crown 307. In some examples, the wearable device can include instructions to alter configurations to specify sides of the wearable device, such that a user can orient the wearable device as needed (e.g., to configure the wearable device for use on a left or a right hand wrist). Such instructions optionally alter the interpretation of received signals (e.g., the polarity of incoming signals).

As described herein, external device 304 can be configured to transmit one or more signals that couple to wearable device 302, optionally through the user's body in contact with external device 304. As referred to herein, an "active hand" can refer to a body part, such as active hand 306, or a portion of the body part (e.g., a finger), closest to the wrist-worn wearable device, and distinguishable from the rest of the user's body by the wearable device as described herein (e.g., the active hand is on the first side of the wearable device and the rest of the user's body including the passive hand are on the second side of the wearable device). As referred to herein, "passive hand" can refer to a body part, such as passive hand 308 further from wearable device 302 (e.g., the opposite wrist from passive hand 308). It is understood that active hand 306 and passive hand 308 are merely simplifications for illustrative purposes, and can represent other body parts are separated by wearable device 302. The designation of certain body parts as active or passive can be configurable based on the placement of the wearable device, the configuration of the electrodes of the wearable device, and/or the body part the user indicates for detection of intentional touches.

Wearable device 302 can be configured to determine using the signals received at the electrodes of the wearable device whether a coupling pathway associated with contact of the active hand 306 with external device 304 exists, whether a coupling pathway associated with contact of a different body part (e.g., passive hand 308) with external device 304 exists, and/or whether there is no physical contact between the user and external device 304. In some examples, wearable device 302 can be configured to determine touch between one or more body parts (e.g., active hand 306, passive hand 308, etc.) and the external device 304 based on signals (e.g., impulses, sinusoidal waves, modulated signals, periodic waves) transmitted by the external device 304. In some examples, the one or more signals can include sequences, such as a first periodic signal waveform at a particular frequency (e.g., a burst), followed by one or more impulses. In some examples, the one or more impulses can include one or more first impulses having a first polarity and one or more second impulses having a second polarity (e.g., opposite polarity). In some examples, the one or more impulses can use the different sequences of polarities to encode information. In some examples, the sequences can be predetermined, optionally when the external device and the wearable device are first paired. In some examples, the sequences can include device identification information and/or a rolling code. It is understood that the sequences presented herein are merely exemplary, and not limiting in any way. For example, some or all of the one or more impulses can precede the periodic signal waveform, a lesser or greater number of impulses can be included in a sequence, or a train of repeating impulses can be included in the sequence, among other possibilities. Referring back to FIG. 2, wearable device 302 can be configured to receive the one or more signals (e.g., using sensing circuitry 203) and processing circuitry (e.g., DSP 206 or host processor 208) can be configured to determine that the received one or more signals correspond to the touch between active hand 306 and external device 304 (e.g., due to signals propagating from external device 304 through the active hand 306 and any intervening tissues of the user to wearable device 302). Such sensing and processing circuitry can additionally be configured to determine if the received signals couple to wearable device 302 through alternative pathways indicative of a touch between a passive hand 308 and external device 304 or indicative of proximity without contact between the user and external device 304. Processing circuitry of wearable device 302 can determine the contact condition (active hand, passive hand, and/or no contact) based on characteristics of the received signal, for example, amplitude, polarity, and phase characteristics. Different amplitude, polarity, and/or phase characteristics can be presented based on differences in the coupling pathways between external device 304 and the user. In some examples, the processing circuitry (e.g., host processor 208 or DSP 206) can use the contact condition to trigger or not trigger one or more operations, such as operations associated with the wearable device 302 and/or with external device 304. As described herein, a touch event with contact between active hand 306 and external device 304 can be referred to as an "active touch event" and a touch event with contact between (passive) passive hand 308 and external device 304 can be referred to as a "passive touch event."

Figure 4:
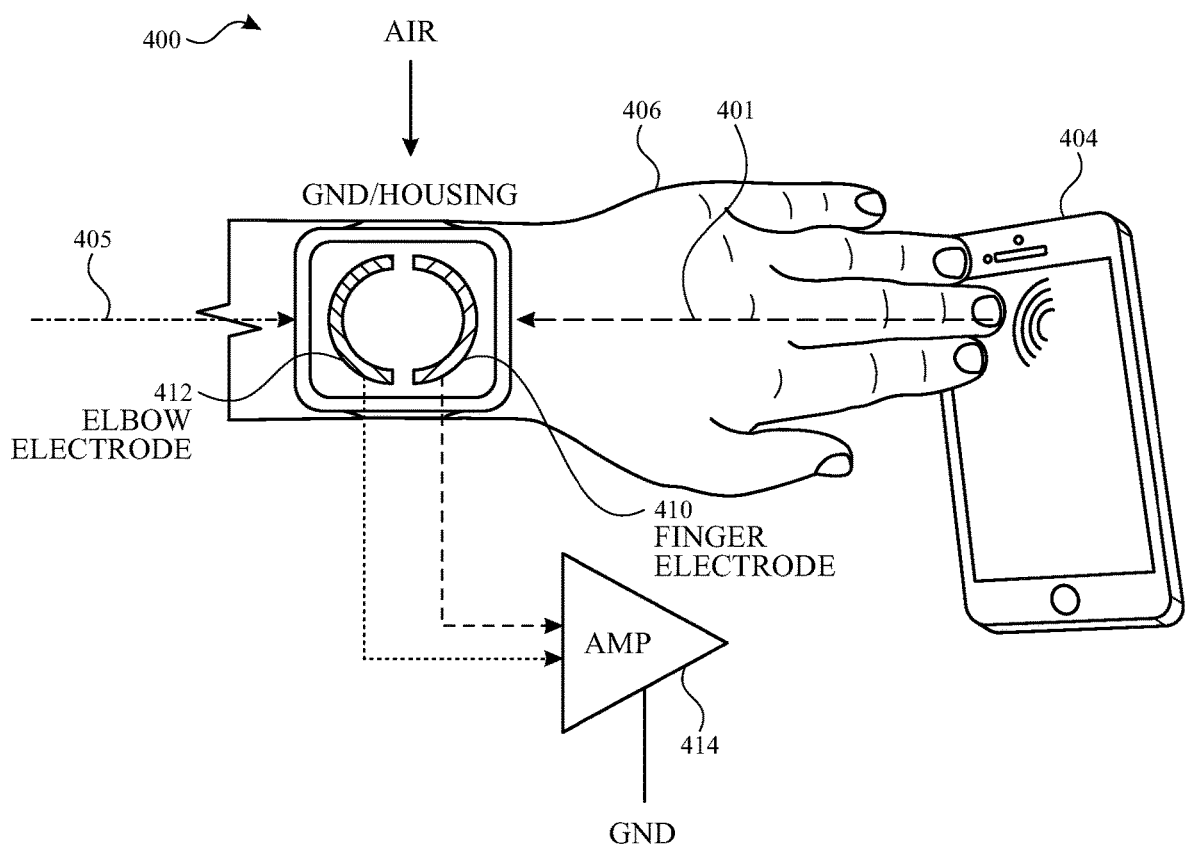
FIG. 4 illustrates an example wearable device configured to determine contact based on one or more signals received from an external device according to examples of the disclosure.

FIG. 4 illustrates an example wearable device configured to determine contact based on one or more signals received from an external device. Wearable device 402 can be worn on a wrist of a user in proximity to active hand 406 (e.g., corresponding to active hand 306), and as described herein, can be configured to determine touch of the user using the active hand based on amplitude and/or phase characteristics of received signals. In some examples, wearable device 402 can include two electrodes, such as finger electrode 410 and elbow electrode 412. In some examples, the two electrodes can be disposed on the underside of wearable device 402, such that the electrodes contact the skin of the wrist when the underside of wearable device 402 is worn on the wrist. A first electrode, referred to herein as a finger electrode, can be configured such that at least one or more portions of finger electrode 410 are closer to the fingers of a user of wearable device 402 than one or more portions of a second electrode, referred to herein as an elbow electrode. It is noted that naming conventions of finger or elbow electrodes are merely used to convey that the relative position of a first electrode can generally be closer to active hand 406 of the user (e.g., corresponding to a finger electrode) than a second electrode (e.g., corresponding to an elbow electrode). Finger electrode 410 and elbow electrode 412 can be coupled to one or more amplifiers, such as amplifier 414 (e.g., corresponding to sensing circuitry 203). In some examples, respective inputs of amplifier 414 can be coupled to the finger electrode 410 and the elbow electrode 412. In some examples, amplifier 414 can be a differential amplifier configured to generate a differential output signal or measurement. In some examples, finger electrode 410 and elbow electrode 412 can respectively be connected to single-ended amplifiers, where each single-ended output is coupled to respective inputs to amplifier 414. In some examples, amplifier 414 can be referenced or coupled to an electrical ground, for example, the housing of wearable device 402. In some examples, single-ended amplifiers can generate a differential measurement by tying each single-ended output to inputs of a differential amplifier. In some examples, a differential measurement can be made using any suitable analog and/or digital circuitry (e.g., a subtraction block).

In some examples, the electrode arrangement illustrated in FIG. 4 can disambiguate contact based on amplitude, polarity, and/or phase characteristics received by electrodes of wearable device 402. For example, a signal transmitted by external device 404 can couple through the active hand 406 to finger electrode 410 via active signal path 401, where the received signal has a first amplitude and polarity. The signal can further propagate through the tissues of the user (e.g., along active signal path 401) and can couple to the elbow electrode 412. In some examples, the signal received at elbow electrode 412 can have a second, lower amplitude, such that a differential measurement generated by amplifier 414 based on the signals generated by finger electrode 410 and elbow electrode 412 can correspond to the difference between the received signal having the first amplitude and the received signal having the second amplitude. It can be appreciated that an electrode closer to the signal source can have a higher relative strength (e.g., amplitude) than an electrode further from the signal source due to attenuation and/or distortion along a coupling pathway (e.g., due to tissues of the user or other sources of signal interference). In some examples, the respective electrodes of wearable device 402 can each have unique characteristics (e.g., material(s), dimensions, shape, placement) to improve contact disambiguation (e.g., between an active touch event, a passive touch event, and/or other measurements not caused by, or associated with, an active touch event).

In some examples, a signal transmitted by external device 404 can couple through the passive hand 408 (e.g., in response to contact between the passive hand and the external device as described with respect to FIG. 3 via passive signal path 405), such that a first signal received at finger electrode 410 can have a first amplitude and a second signal received at elbow electrode 412 can have a second, higher amplitude. For example, signals transmitted via the passive hand 408 and coupled to the finger electrode 410 can be attenuated relative to signals coupled to the elbow electrode 412 due to sources of loss and/or interference between finger electrode 410 and elbow electrode 412 (e.g., along passive signal path 405). In some examples, external device 404 can be configured to transmit a periodic signal, and the processing circuitry can be configured to determine a rising or falling edge of the differential measurement. The periodic signal can be a sinusoidal waveform that can couple to elbow electrode 412 and finger electrode 410. It is understood that the periodic signal can be any waveform (e.g., sawtooth, triangular, square, ramp, modulated waveforms). In some examples, the periodic signal is configured to send an impulse or a single pulse, and the polarity of signals received based on the impulse or single pulse can be indicative of a location of the signal origin and coupling path (e.g., through the active hand, the passive hand, or another body part).

Figures 5A, 5B, 5C:
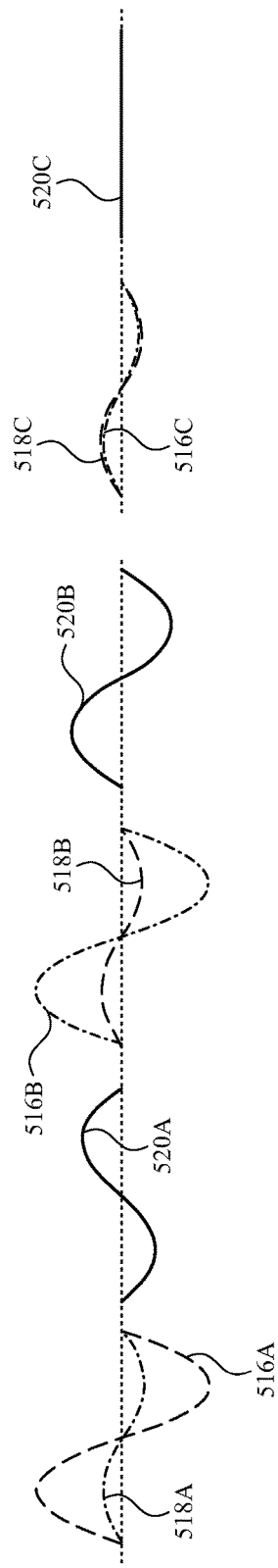
FIGS. 5A-5C illustrate example waveforms associated with sensing circuitry of a wearable device according to examples of the disclosure.

FIGS. 5A-5C illustrate example waveforms of associated with sensing circuitry of a wearable device according to examples of the disclosure. In some examples, the waveforms illustrated in FIGS. 5A-5C can correspond to inputs and outputs of differential measurements by the sensing circuitry discussed with respect to FIG. 4 under different contact conditions. For example, the waveforms illustrated in FIGS. 5A-5C can correspond to inputs and an output of amplifier 414 (whose inputs are coupled to finger electrode 410 and elbow electrode 412 to generate a differential measurement), under different contact conditions. Characteristics including phase and amplitude of the waveforms and differential measurement(s) can be used to determine whether one or more devices can execute, or forgo, performance of functions (e.g., by the wearable device). In some examples, polarity of single bits, impulses, or the beginning of periodic bursts may additionally or alternatively be used to make the determination.

FIG. 5A illustrates example input and output waveforms where a periodic signal (e.g., a sinusoidal signal) from an external device that is propagating through the body of a user of a wearable device during a passive touch event (e.g., via passive signal path 405). For example, the amplitude of elbow signal 516A at the first input to amplifier 414 (e.g., corresponding to a signal generated by an elbow electrode) can have a greater amplitude than the amplitude of finger signal 518A at the second input to amplifier 414 (e.g., corresponding to a signal generated by a finger electrode). The waveforms can be aligned, or nearly aligned in time (e.g., due to the propagation characteristics of the signals in the tissue and the distance between the electrodes), such that a differential measurement at the output of amplifier 414 based on elbow signal 516A and finger signal 518A at the inputs of amplifier 414 results in a waveform with similar phase shifts, as shown by differential signal 520A.

FIG. 5B illustrates example input and output waveforms corresponding to a periodic signal (e.g., a sinusoidal signal) from an external device that is propagating through the body of a user of a wearable device during an active touch event (e.g., via active signal path 401). In a similar manner as described with respect to FIG. 5A, the amplitude of elbow signal 516B at the first input to amplifier 414 (e.g., corresponding to a signal generated by an elbow electrode) can have a smaller amplitude than the amplitude of finger signal 518B at the second input to amplifier 414 (e.g., corresponding to a signal generated by a finger electrode) because the signals are coupling to elbow and finger electrodes through an active hand. The waveforms can be aligned, or nearly aligned in time (e.g., due to the propagation characteristics of the signals in the tissue and the distance between the electrodes), such that a differential measurement at the output of amplifier 414 based on elbow signal 516B and finger signal 518B at the inputs of amplifier 414 results in a waveform with different phase shifts, as shown by differential signal 520B.

FIG. 5C illustrates example input and output waveforms where a periodic signal (e.g., a sinusoidal signal) from an external device couples to electrodes of a wearable device without contact between the user and the external device. For example, the coupling can be through the air and not via a pathway through the body (e.g., not via a galvanic or capacitively coupled pathway to the user's body). In some such examples, elbow signal 516C and finger signal 518C at the inputs to amplifier 414 can be in-phase (or within a threshold of in-phase) and can have the same amplitudes (or within a threshold of the same amplitude). A differential measurement at the output of amplifier 414 can therefore have a low (e.g., less than a threshold) or zero amplitude waveform, as shown by differential signal 520C in FIG. 5C.

As shown in FIG. 5C, the wearable device can determine, based on the amplitude of the differential measurement being below a threshold, that the contact condition corresponds to a lack of contact between the user and the external device. As a result, the device can forgo detecting an active touch event (or any touch event) and forgo performance of one or more functions. Referring back to FIGS. 5A-5B, the amplitude at the output under a passive touch event and an active touch event may appear similar (though inverted).

In some examples, the wearable device can be configured to determine a start time corresponding to the transmission of the periodic signal (e.g., from an external device) using measurements associated with elbow signal, finger signal, and differential measurements.

In some examples, stimulus can be transmitted with a leading edge (e.g., a rising edge or a falling edge) and/or last for a predetermined period of time. As shown in FIG. 5A, a signal transmitted (e.g., by an external device before, during, and after an active touch event) having a leading rising edge can couple through the body of a user to an elbow electrode at a greater amplitude than to a finger electrode. A wearable device including the electrodes can process the differential measurement, optionally filtering the measurement, and identify that the differential measurement exhibits an initial falling edge (e.g., the differential measurement falls below a reference voltage level after the beginning of a determined time period). The wearable device can then determine that the initial falling edge does not correspond to an active touch event based on the phase information of the differential measurement. For example, the phase of differential signal 520A can be inverted, or shifted by 180, or nearly 180 degrees relative to a transmitted signal (e.g., a sinusoidal or periodic waveform) having an initial rising edge as shown in FIG. 5A. An initial rising edge of the transmitted periodic signal, for example, can therefore correspond to an initial rising edge in the differential measurement (e.g., the transmitted periodic signals used for the differential measurement are more or less in phase). FIG. 5B thus illustrates an example where a wearable device positively determines that the differential measurement is indicative of intentional touch during an active touch event and subsequently trigger performance of one or more functions. In this way, FIGS. 5A-5B illustrate examples where a device can determine an active touch event based on polarity or phase of one or more differential measurements. In some examples, the wearable device can forgo performance of one or more functions in response to a passive touch event not meeting criteria related to the phase or polarity of the one or more differential measurements It is understood that the previously described examples are merely exemplary in nature, and not limiting in any way. For example, some or all of the scenarios described above can occur simultaneously, such that multiple signals coupling through multiple paths can cause stimulus of electrodes of a wearable device. The wearable device can determine amplitude and phase characteristics of the differential measurement to determine satisfaction of criteria to invoke/perform (or not invoke/perform) one or more functions of the device. In some examples, sensing circuitry including the electrodes can be varied to improve determination of criteria. For example, the arrangement, placement, materials, dimensions, and shapes of the electrodes can be changed. In some examples, the electrodes can be galvanically or capacitively coupled and the coupling capacitance and/or dielectric properties of intervening insulating materials can vary. In addition, the wearable device can include any number of components and/or configured to execute operations to improve determination of the criteria (e.g., analog and/or digital filters, passive components, trace routing, digital delays). In some examples, the sensing circuitry can include an array of electrodes that can be coupled together, sensed together or in some combination, and/or tied to multiple amplifiers. The wearable device can be configured to use an aggregate, or some subset of, measurements from the array of electrodes. In some examples, transmitted signals can be modulated to carry information used by the wearable device. For example, the wearable device can receive digitally modulated signals using embedded phase information (e.g., associated with the transmitted signal(s)). Additionally, the transmitted signals can include information such as levels of processing gain. The modulation can include any suitable scheme to improve fidelity of data, such as phase-shift keying, frequency-shift keying, amplitude-shift keying, on-off keying, quadrature modulation, continuous wave modulation, orthogonal frequency-division multiplexing modulation, wavelet modulation, spread-spectrum techniques, pulse modulation, delta modulation, etc. In some examples, the wearable device is configured to demodulate modulated signals to recover any encoded information. In this way, the wearable device can be configured to receive signals including information to aid in detection and communication between an external device.

Figure 6:
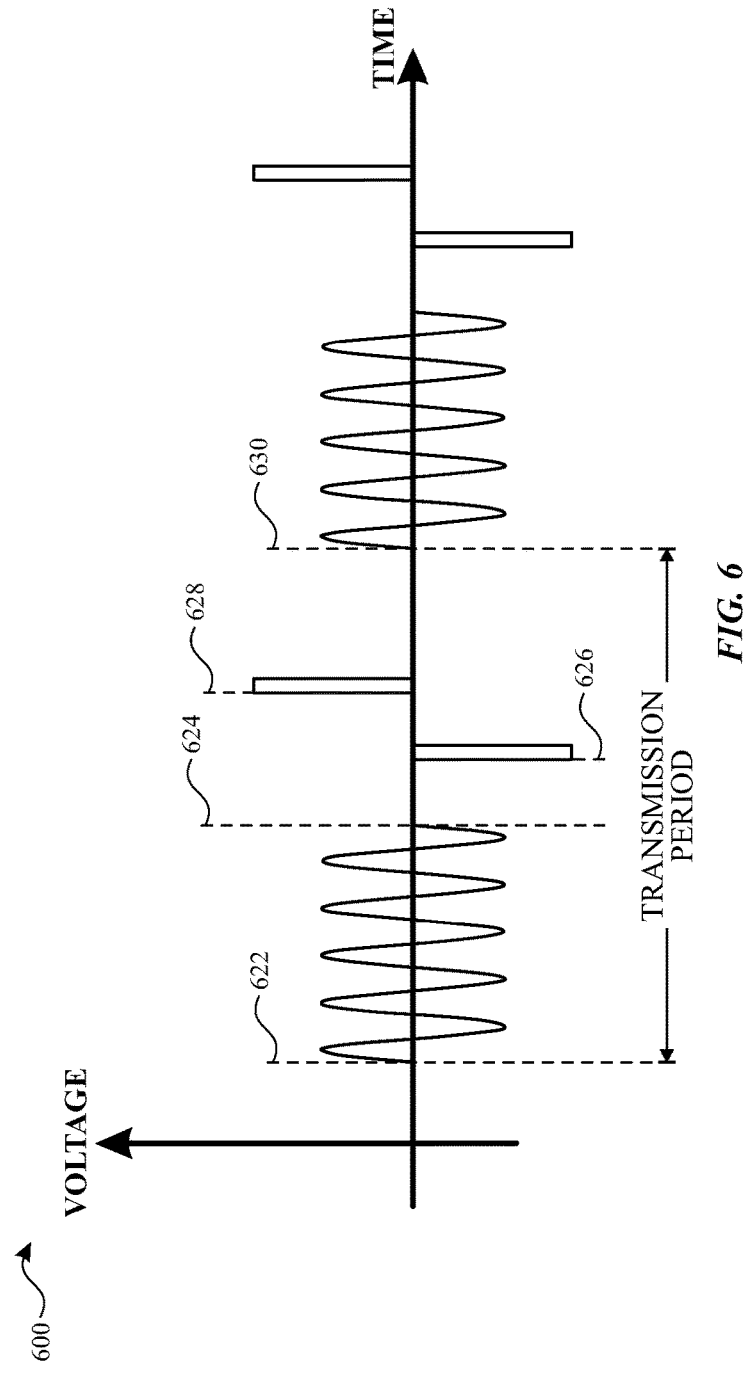
FIG. 6 illustrates example waveforms associated with sensing circuitry of a wearable device according to examples of the disclosure.

FIG. 6 illustrates example waveforms associated with sensing circuitry of a wearable device according to examples of the disclosure. In some examples, waveforms 600 can represent signals transmitted from an external device according to examples of disclosure. In some examples, waveforms 600 can have characteristics that enable touch detection and disambiguation of contact conditions, for example, a device comprising a touch-sensitive surface. For example, at timestamp 622, the external device can begin transmitting a first type of waveform. In some examples, the first type of waveform can be a sinusoidal waveform oscillating at a known frequency. The frequency can be predetermined (e.g., known to the wearable device) and/or communicated between the external device and the wearable device (e.g., as part of a pairing processes between the external device and the wearable device). Additionally or alternatively, a timing information (e.g., a relative time) corresponding to timestamp 622 can be communicated between the external device and the wearable device, such that the wearable device is aware of a transmission time of the first waveform. The first waveform can be transmitted throughout the entirety, or a subset of, the duration of a time period spanning from timestamp 622 to timestamp 624. The duration can also be predetermined and/or communicated between the external device and the wearable device. In some examples, the wearable device as described with respect to examples shown in FIGS. 3-5C can receive the first waveform via electrodes of the wearable device. The received waveforms can be sensed and processed (e.g., via the electrodes, analog and digital filtering and/or signal conditioning elements, mixers, analog-to-digital converters) to determine characteristics of measurements (e.g., differential measurements). In some examples, the sensing and processing can include calculations and functions to improve signal quality, data rates, and/or data detection. It can be appreciated that in some examples, processing can be accomplished any combination of the wearable device, the external device, and any other computational device(s). For example, data from or based on the differential measurements can be processed, partially or entirely, by a cloud server in communication with the wearable device.

In some examples, the characteristics can include a phase of one or more differential measurements. The wearable device can be configured to determine a rising or falling edge of one or more differential measurements, and accordingly determine whether a differential measurement corresponds to an active touch event between the active hand of the user on the external device (e.g., corresponding to the differential output in FIG. 5B) or a passive touch event between the passive hand of the user on the external device (e.g., corresponding to the differential output in FIG. 5A). In some examples, the characteristics can include timing information communicated between the external device and the wearable device, optionally used to determine relative timing between the first waveform and a second waveform. For example, a time associated with a period beginning with timestamp 624 and ending with time period 630 can be determined. It is understood that any relevant timing information associated with the first and the second waveform can be determined, including the timing of the second waveform, such as an impulse transmitted at timestamp 626 or timestamp 628, a duration of the second waveform, delays associated with the second waveform, modulation associated with the first and/or second waveforms, etc. In some examples the polarity of an impulse transmitted at timestamp 626 is an indicator of the information (e.g., the polarity communicates a bit of information), or of active/passive hand orientation, as discussed previously. As shown in FIG. 6, the first and/or the second waveform can be repeated over time, and similar measurements and determinations can be made (e.g., by a wearable device). In some examples, repeated bursts of waveforms (e.g., sinusoidal "tones") followed by impulses of differing polarities can transmit data. For example, a respective impulse can correspond to a bit of information. In some examples, repeating the bursts and impulses can be interpreted (e.g., by a wearable device) as a stream of data (e.g., a stream of bits). In some examples, respective bursts (e.g., sinusoidal tones) can have differing frequency content (e.g., can respectively be sinusoidal tones oscillating at respective frequencies) to encode information. In some examples, the duration or timing of the bursts can be configured to encode information. In some examples, received signals corresponding to the stream of data can be averaged to improve SNR and data fidelity. A wearable device can use the determined characteristics to determine if criteria corresponding to an active touch event have been met. In this way, the timing information can determine one or more time(s) associated with the second waveform. In some examples, the times associated with the second waveform can be used to improve sensing and/or determination of the active touch event. For example, the wearable device can be configured with circuitry to increase resolution of signal detection, and/or selectively toggle power states of circuitry for high-fidelity differential measurements of the second waveforms coupling to electrodes of the wearable device. For example, a first, negative impulse, transmitted at timestamp 626, can be used to generate a first differential measurement. A subsequent second, positive impulse, transmitted at timestamp 628, can be used to generate a second differential measurement. In some examples, the wearable device can use a polarity of the first and the second differential measurements as criteria in determining an active touch event. It is noted that the above examples are merely exemplary and not limiting; the examples disclosed herein can include any number of variations in transmission schemes. For example, the second waveform can be a single impulse or a train of impulses. Additionally, the impulses can include any pattern to improve determination of the active touch event. Additionally, the second waveform is not strictly limited to one or more impulses. As described previously, the second waveform can be a modulated waveform, and can include waveforms of varying patterns and characteristics, and can be configured to encode information.

Figure 7A:
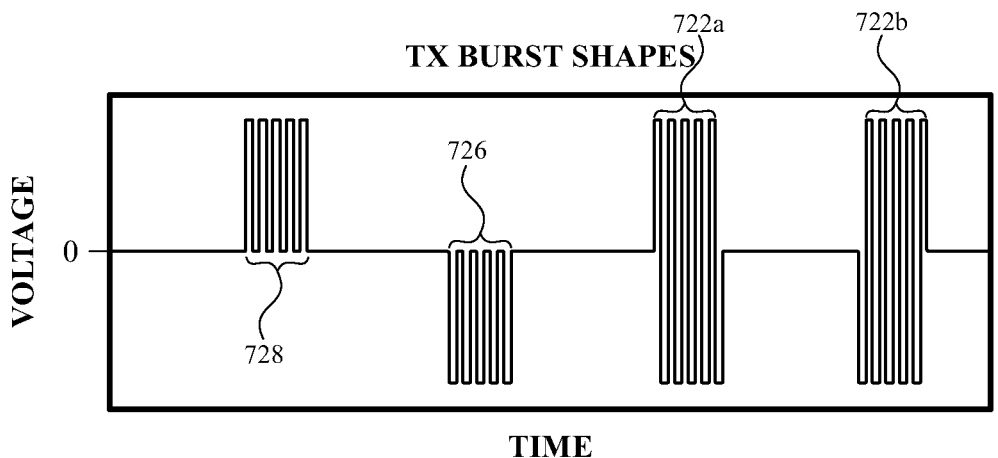
FIGS. 7A-7D illustrate example waveforms associated with transmitting circuitry of an external device and sensing circuitry of a wearable device according to examples of the disclosure.
Figure 7B:
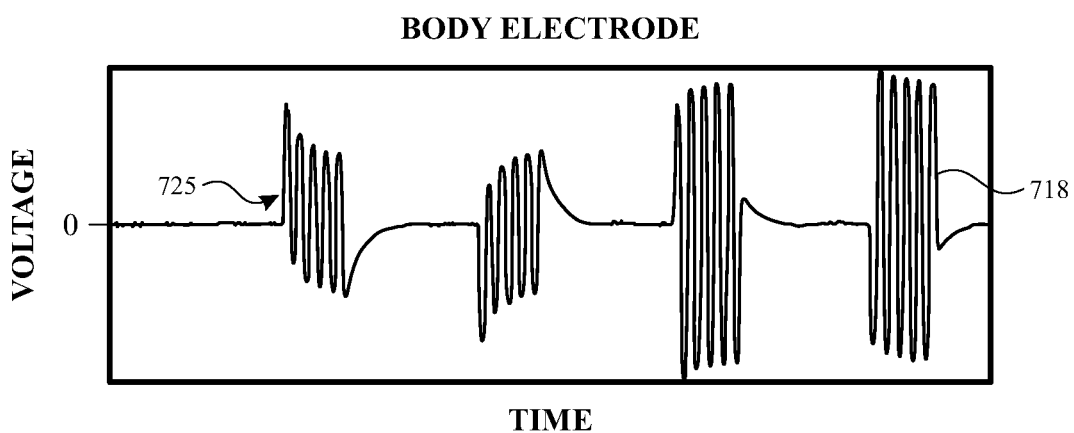
Figure 7C:
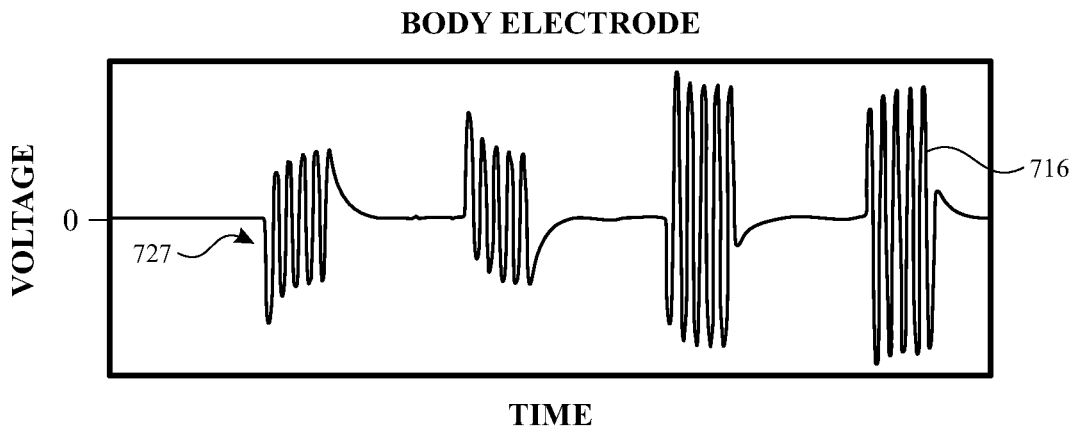

FIGS. 7A-7D illustrate example waveforms associated with transmitting circuitry of an external device and sensing circuitry of a wearable device according to examples of the disclosure. Specifically, FIG. 7A illustrates example waveforms associated with transmitting circuitry of an external device, FIG. 7B illustrates waveforms associated with the sensing circuitry of a wearable device corresponding to an active touch event, and FIG. 7C illustrates waveforms associated with the sensing circuitry of a wearable device corresponding to a passive touch event. In some examples, respective time axes of FIGS. 7A-7C can be aligned, or nearly aligned, to illustrate that waveforms generated by sensing circuitry as shown in FIGS. 7B and 7C can be generated in response to waveforms transmitted by an external device as shown in FIG. 7A. FIG. 7A illustrates a positive impulse train 728 (e.g., corresponding to impulse at timestamp 628) followed by a negative impulse train 726 (e.g., corresponding to impulse at timestamp 626) transmitted from an external device to a wearable device that can be used to determine an active touch event as described with respect to FIGS. 3-6. In some examples, a waveform 718 (FIG. 7B) can be illustrative of a received signal generated by an electrode of a wearable device in response to a transmitted signal generated by an external device. In some examples, a sequence of a positive impulse train 728 followed by a negative impulse train 726 can correspond to the second waveform described with respect to FIG. 6. In some examples, waveform 722a can correspond to the first waveform as described with respect to FIG. 6. The first waveform can additionally comprise waveform 722b, which can correspond to an inverted version of waveform 722a.

As shown in FIG. 7B, a waveform 718 corresponding to an active touch can exhibit an initial rising edge 725, indicative of the active touch event (e.g., generated in response to an initial rising edge of positive impulse train 728). In some examples, as illustrated in FIG. 7C, waveform 716 can exhibit an initial falling edge 727 (e.g., generated in response to the initial rising edge of positive impulse train 728). It is understood that the polarity and characteristics of the waveforms illustrated are exemplary, and description presented herein can also apply to differential measurements based on the waveforms. In some examples, differential measurements based on waveform 716 or 718 can be generated. In some examples, the waveforms can be subject to signal processing. For example, the wearable device can be associated with one or more components, included within, coupled to, and/or otherwise in communication with the wearable device (e.g., digital signal processor 206, host processor 208, and/or additional processing circuitry including dedicated processors and computational circuits). Such components can be configured to perform digital processing techniques (DSP) by communicating with one or more devices external to the wearable device (e.g., the external device, a mobile handset communicating with the wearable device, a cloud server). For example, the components can be configured to apply one or more computational transformations including, but not limited to, a discrete Fourier transform (DFT), fast Fourier transform (FFT), and other computational operations including Goertzel algorithms, optionally configured to determine the presence of signals associated with the wearable device and an active touch event. Additionally, the components can be configured to alter frequency content of the waveforms. For example, one or more mixers and associated components can be used to down-convert the frequency of the signal. Additionally, one or more filters (e.g., finite impulse response, infinite impulse response, discrete filters, passive component filters) can be provided along the signal chain of the wearable device. In some examples, one or more routing elements (e.g., switches, multiplexors) can be included in the components. The above can be configured in any combination to improve detection of the active touch event, including the determination of edges of the signal and/or determination of the presence and/or polarity of one or more impulses (e.g., corresponding to the impulse trains 728 and 726).

The examples described herein can improve detection of impulses, for example, by substantially attenuating noise that can interfere with determination of active touch events. For example, as described previously, a first waveform (e.g., a periodic waveform) can be transmitted by the external device. In some examples, the wearable device can be aware of frequency content of the first waveform. For example, the wearable device can include instructions expecting the first waveform to predominantly comprise a frequency that is predetermined and/or communicated to the wearable device before the transmission of the first waveform. In some examples, one or more computations can be applied by the wearable device, or using computational circuitry and components in communication with the wearable device, to provide timing information of one or more waveforms. For example, assuming that the wearable device is aware that the first waveform predominantly comprises a first frequency, the wearable device can use a Goertzel algorithm or filter to detect the start time, end time, or peak time of the first waveform (or any other suitable time/characteristic associated with the first waveform). The detection of the first waveform can include any suitable calculations and operations, and it is understood that computations such as a Goertzel filter can reduce computational load to rapidly, and optionally in real-time, detect the first waveform. As described previously, following the detection of the first waveform is understood to be not limited, and can include any combination of suitable detection configurations (e.g., dedicated tone detection circuitry, computational methods of tone and/or frequency content detection). The detection can include, for example, statistical functions, mathematical transformations, and machine learning methods.

In some examples, following the first waveform, a second waveform can be captured. For example, the second waveform can comprise one or more impulses. In some examples, to improve detection of the impulses, the presence of the first waveform can be used as a reference point to time-correlate the second waveform, as described with respect to FIG. 6. In some examples, the first and second waveforms can be repeated, and measurement results from the first and/or second waveform can be aggregated to determine characteristics of the waveforms. For example, measurements associated with the second waveform can be time-averaged, or otherwise aggregated (e.g., weighted average, etc.), such that the wearable device can differentiate the second waveform(s) from a noise floor. By aggregating the results of multiple measurements (e.g., signals associated with the second waveform), a wearable device can increase the relative confidence of the presence of signals (e.g., impulses included in the second waveform), and better determine the satisfaction or failure of criterion based on characteristics of measurements (e.g., amplitude thresholds, phase thresholds).

Figure 7D:
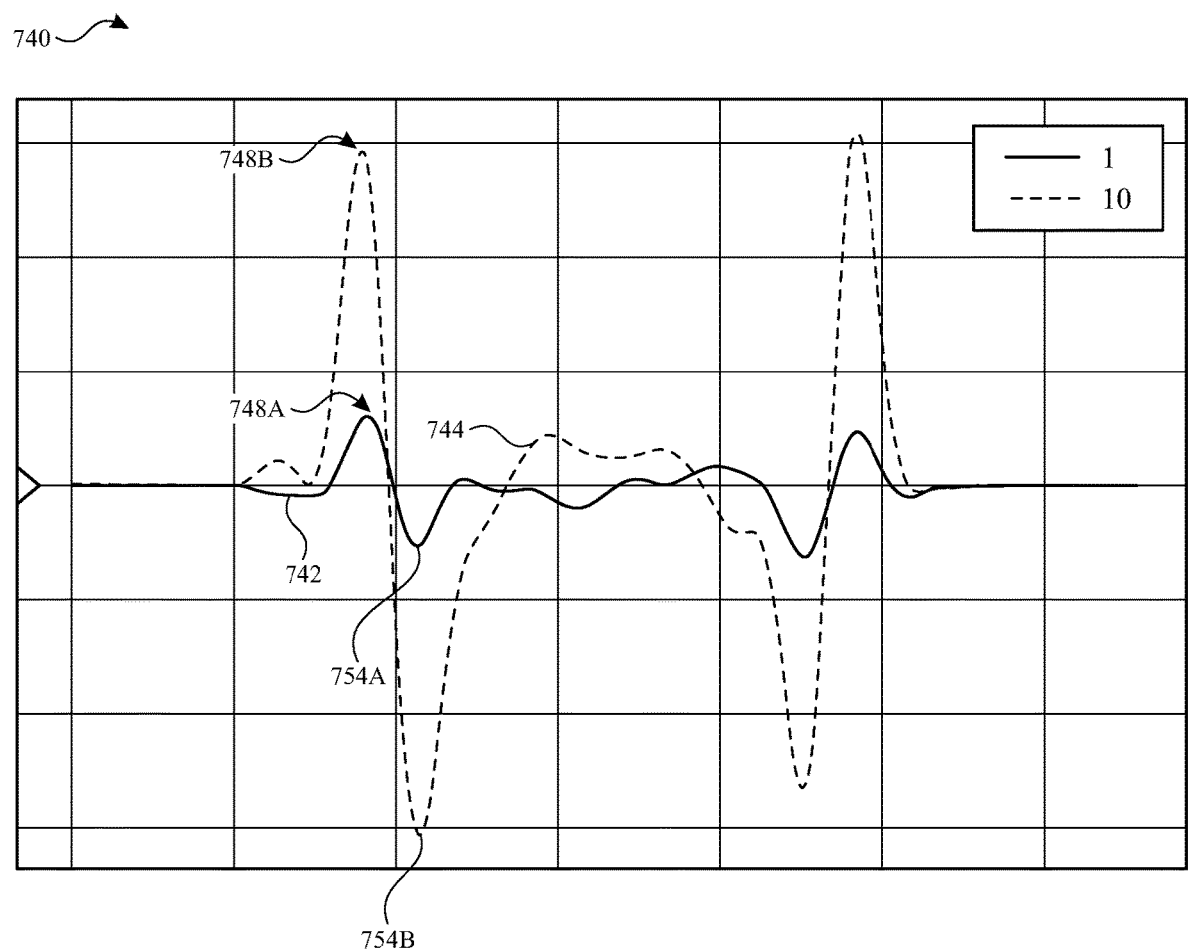

FIG. 7D illustrates example waveforms associated with transmitting circuitry of an external device and sensing circuitry of a wearable device according to examples of the disclosure. In some examples, as described with respect to FIG. 7A-7C, a first waveform includes a periodic waveform, and a second waveform includes one or more impulses. Plot 740 illustrates example waveforms of signal processed by a device (e.g., a wearable device). In some examples, waveforms received by electrodes of the device based on the first waveform and second waveform are processed (e.g., downconverted, filtered, and/or otherwise processed to determine indications of intentional contact). For example, waveform 742 and waveform 744 can be based on the relative magnitude and polarity of the waveforms received by the electrodes and subject to processing (e.g., by the wearable device). Waveform 742, for example, corresponds to signals that are processed but not subject to averaging or other aggregation. As such, the peak 748A, which optionally corresponds to a positive polarity impulse transmitted by an external device (e.g., the impulse observed at timestamp 628 in FIG. 6) can have a first magnitude. As described previously, wrapping (e.g., phase wrapping) a plurality of signals using the first waveform as a time-reference optionally is used to average and/or aggregate measurement results corresponding to the second waveform. For example, waveform 744 corresponds to an averaged result based on a first plurality (e.g., 10) of signals, where the averaged result is based on a plurality of second waveforms. As such, the magnitude of peak 748B corresponding to waveform 744 has a higher magnitude compared to peak 748A. The relatively higher magnitude associated with peak 748B can thus provide a relative improvement in SNR event due to the boost in signal from aggregation. The improved SNR can improve performance by processing circuitry of the wearable device in detecting and disambiguating an intentional touch event relative to the relatively lower magnitude associated with peak 748A with relatively lower SNR.

As described herein, in some examples, the wearable device can include more than two electrodes. FIGS. 8A-8C illustrate configurations of a wearable device including three electrodes according to examples of the disclosure. FIGS. 9A-9D illustrate example waveforms associated with sensing circuitry of a wearable device of FIG. 8A-8C according to examples of the disclosure. In some examples, wearable device 802 can be a wrist-worn device including two electrodes including a finger electrode 810 and elbow electrode 812 (e.g., corresponding to finger and elbow electrodes described with respect to FIGS. 4-7). Each wearable device 802 can further include a third electrode, such as common electrode 832A-832C. In some examples, the three electrodes can be disposed on the underside of wearable device 802, such that the electrodes contact the skin of the wrist when the underside of wearable device 802 is worn on the wrist. In some examples, finger electrode 810 and common electrodes 832A-832C can be coupled to respective inputs of an amplifier 814. In some examples, elbow electrode 812 and common electrodes 832A-832C can be coupled to respective inputs of another amplifier 815.

In some examples, common electrodes 832A-832C can be designed to generate signals with particular characteristics relative to finger electrode 810 and elbow electrode 812. For example, common electrodes 832A-832C can be designed to measure a waveform with an amplitude greater than an amplitude of a waveform measured by finger electrode 810 and/or an amplitude of a waveform measured by the elbow electrode 812. In some examples, electrodes can be configured such that noise can couple equally, or nearly equally, to common electrodes 832A-832C, finger electrode 810, and elbow electrode 812, such that noise sources coupling to wearable device 802 can become common-mode when measuring differential signals using the electrodes. In some examples, properties of the common electrode can be varied, such as the dimensions (e.g., surface area), shape, and thickness of the electrode. In some examples, the common electrode (e.g., common electrode 832A) can be configured such that a surface area of the common electrode exceeds or is less than a surface area of finger electrode 810 and/or a surface area of elbow electrode 812, as shown in FIG. 8A. In some examples, the common electrode 832B can be located at a position of wearable device 802 to enable coupling of signals that can interference with active touch detection. For example, FIG. 8B shows an example in which the common electrode is disposed along a side of the wearable device (e.g., in addition to or instead of the underside of the wearable device) where interfering signals can couple to common electrode 832B (e.g., electromagnetically). In some examples, the common electrode can be formed as part of the housing of the wearable device or be contained or isolated within the wearable device. In some examples, the common electrode can be configured to at least partially surround and/or wrap around finger electrode 810 and/or elbow electrode 812, as shown in FIG. 8C (e.g., not just in between finger electrode 810 and/or elbow electrode 812 shown in FIG. 8A). Common electrodes 832A-832C can also optionally be varied in construction, including, but not limited to, its constituent material(s) to increase signal coupling of the common electrodes 832A-832C compared to signal coupling of finger electrode 810 and/or elbow electrode 812. For example, the finger, elbow, and/or common electrodes can be dry electrodes, optionally coupled to skin of a user without the assistance of dielectric gels or liquid. Such electrodes optionally are made of metals and/or metal-alloys (e.g., steel, titanium, silver, and/or gold). In some examples, the electrodes are coated using one or more thin layers of non-metallic conductive material(s), such as conductive rubber(s), fabric(s), and/or polymer(s) (e.g., conductive silicone). In some examples, capacitive or galvanic coupling properties can be varied using such metals and non-metallic conductive material(s). In some examples, such coating layers are disposed using physical vapor deposition (PVD). For example, coating layers optionally are sputtered over electrodes surfaces to improve coupling between the electrodes and desired signals (e.g., signals from an external device). Common electrodes 832A-832C can also be coupled to and/or through one or more layers of material (e.g., dielectric materials, additional electrode materials). In some examples, common electrodes 832A-832C can be configured as at least a portion of a housing of the wearable device. In some examples, common electrodes 832A-832C can be used to detect contact condition (e.g., to identify an active touch event) based on amplitude of one or more differential measurements including the common electrode. In some examples, waveforms generated by common electrode 832A-832C can have a greater amplitude than other waveforms. In the event a relatively strong signal travels from an external device, through a hand of a user closest to wearable device 800, (e.g., corresponding to an active touch event as shown by active signal path 401) finger electrode 810 can measure a signal having a relatively larger amplitude than a signal generated by elbow electrode 812. In the event a relatively strong signal does not correspond to an active touch event, finger electrode 810 can measure a signal having a relatively smaller amplitude than a signal generated by elbow electrode 812.

FIG. 9A can correspond to example input waveforms at the three electrodes of FIGS. 8A-8C and output waveforms for a pair of differential measurements under a passive touch condition. Description of signals that electromagnetically couple to electrodes of wearable device 802 (e.g., through components of the wearable other than the electrodes or via a conductive pathway originating from a body part other than an active hand of the user) are omitted for brevity, but can correspond to examples illustrated in FIG. 9A. A differential measurement 921A can be generated, for example, by taking a difference between common waveform 932A (e.g., corresponding to a waveform generated by common electrode 832A-832C) and elbow waveform 916A (e.g., corresponding to a waveform generated by elbow electrode 812). Similarly, differential measurement 923A can be generated by taking a difference between common waveform 932A and finger waveform 918A (e.g., corresponding to a waveform generated by finger electrode 810). A wearable device can determine, based on the relatively greater amplitude of differential measurement 923A compared with differential measurement 921A, that signals coupling to respective electrodes of the wearable device do not correspond to an active touch event (e.g., correspond to a passive touch event), and forgo execution of one or more functions accordingly (e.g., functions triggered by the detection of an active touch event).

FIG. 9B can correspond to example input waveforms at the three electrodes of FIGS. 8A-8C and output waveforms for a pair of differential measurements under an active touch condition (e.g., where a user wearing wearable device 800 contacts an external device with a hand that is closest to the wearable device). In a similar manner as described with respect to FIG. 9A, a wearable device can determine, based on the relatively greater amplitude of differential measurement 921 compared with differential measurement 923, that signals coupling to respective electrodes of the wearable device correspond to an active touch event, and execute one or more functions accordingly (e.g., functions triggered by the detection of an active touch event).

FIG. 9C can correspond to example input waveforms at the three electrodes of FIGS. 8A-8C and output waveforms for a pair of differential measurements under a passive touch condition. Specifically, FIG. 9C illustrates an example where the respective phase of common waveform 932C, finger waveform 918C, and elbow waveform 916C are inverted compared to the waveforms shown in FIG. 9A. In some examples, the passive touch condition can generate differential measurement 921C (e.g., the difference between common waveform 932C and elbow waveform 916C) having the same, or nearly the same amplitude as shown in the corresponding differential measurement 921A in FIG. 9A. Similarly, the differential measurement 923C shown in FIG. 9C can have the same, or nearly the same amplitude as shown in the corresponding differential measurement 923A in FIG. 9A. Therefore, the wearable device can determine the relative difference between amplitudes of respective differential measurement 921A/921C and differential measurement 923A/923C as a criterion for determining contact condition (e.g., a passive contact condition), optionally without using phase information of the respective differential measurements (e.g., because the same or similar relative amplitude are shown despite phase differences).

FIG. 9D can correspond to example input waveforms at the three electrodes of FIGS. 8A-8C and output waveforms for a pair of differential measurements under an active touch condition. In a similar manner as described with respect to FIG. 9C, FIG. 9D can illustrate an example where the respective phase of common waveform 932D, finger waveform 918D, and elbow waveform 916D are inverted compared to the waveforms shown in FIG. 9B. Also as described with respect to FIG. 9C, the relative amplitude between differential measurement 921B/921D and 923B/921D can be used as a criterion for determining contact condition (e.g., an active contact condition), optionally without using phase information of the respective differential measurements (e.g., because the same or similar relative amplitude are shown despite phase differences). It can be appreciated that the configurations described with respect to FIGS. 9A-9D optionally make noise coupled to sensing circuitry (e.g., differential amplifiers) common-mode, thus improving data transmission and fidelity.

Figure 10:
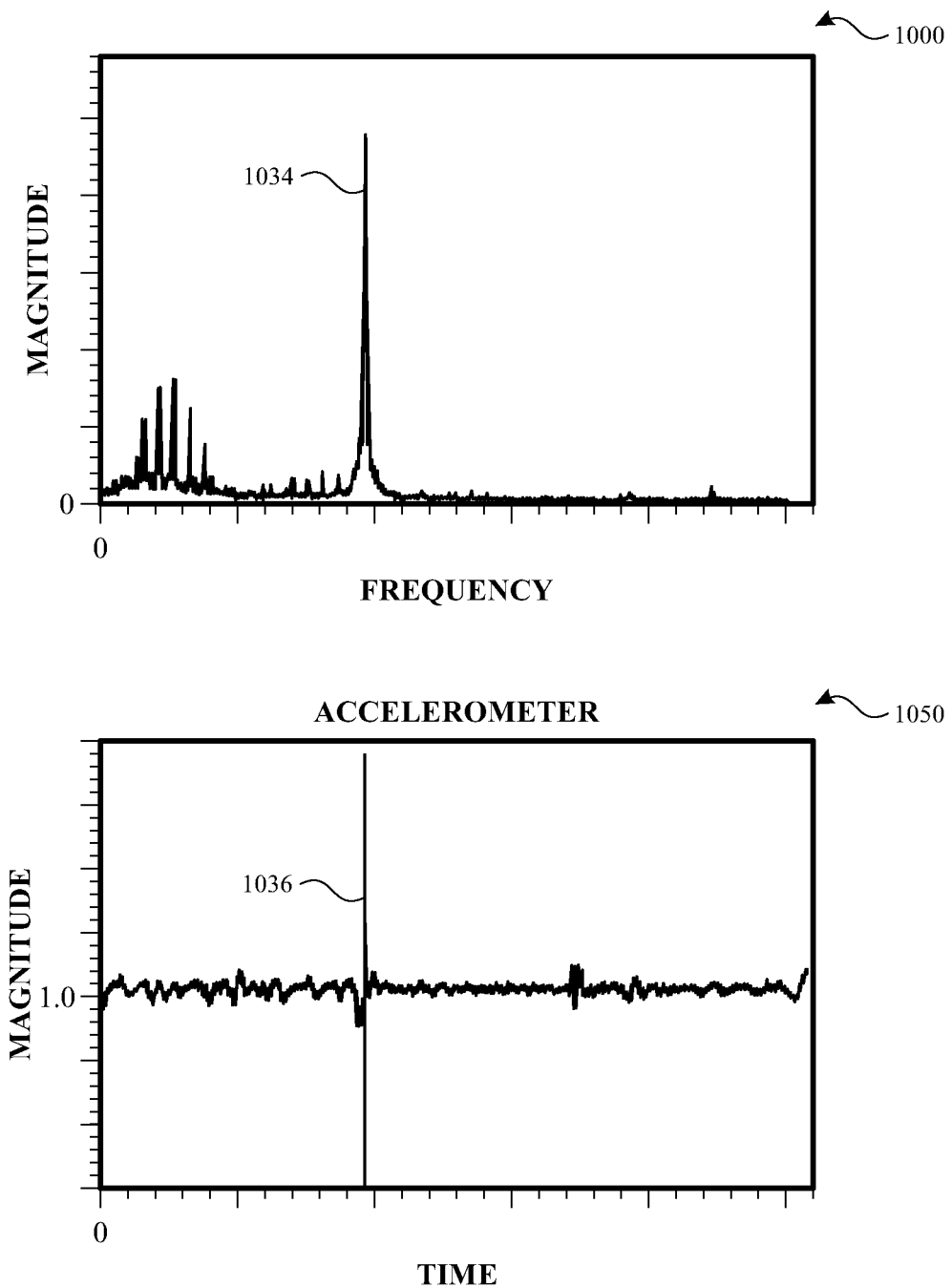
FIG. 10 illustrates waveforms associated with a wearable device according to examples of the disclosure.

In some examples, to improve the touch detection described herein, the information from additional sensors can be correlated with the signals measured using electrodes of the wearable device (e.g., electrodes 410, 412, 810, 812, 832). FIG. 10 illustrates plots of waveforms associated with different sensors of a wearable device according to examples of the disclosure. In some examples, a wearable device can make use of one or more sensors included in, or in communication with, the wearable device to determine the presence of an active touch event. For example, the one or more sensors can include one or more accelerometers (e.g., corresponding to sensors 213) configured to detect movement of the wearable device (e.g., worn on an active hand) and the contact detection sensors described herein to disambiguate active and passive touch events. Plot 1000 and plot 1050 can be representative of frequency-domain data from the electrodes or sensing circuitry described herein and time-domain data collected by accelerometers (e.g., root mean squared measurement of a three-axis accelerometer) of a wearable device according to examples of the disclosure. A transient peak 1036 can correspond to a peak in accelerometer data corresponding to initiation of a touch between a hand closest to a wearable device and the external device (and the stable magnitude afterward is indicative of a lack of movement of the wearable device) as shown in plot 1000. The wearable device as described herein can analyze frequency content of signals incident upon the wearable device at the same time, or nearly the same time, that time-domain data is collected and analyzed as described with respect to FIGS. 1-9D. For example, frequency domain peak 1034 can correspond to measurements collected by, for example, one or more electrodes of the wearable device. The frequency domain peak 1034 can correspond to a signal transmitted by an external device (e.g., at a fixed frequency, or a narrow range of frequencies) as shown in plot 1050 coinciding with the time transient peak 1036 is recorded. Thus, the fusion of information based on one or more electrodes and one or more other sensors can be used to improve intentional touch detection. In some examples, information based on the additional one or more sensors can be used to proactively adjust gain of elements along one or more sensing signal chains to improve receiver chain sensitivity.

The examples described herein can be used to initiate any number of functions, including by transferring any suitable data between the external device and the wearable device. It is understood that description of example functions that follow can be combined for use with the contact detection examples described with respect to FIGS. 3-10. In some examples, a wearable device can transmit device identification information, including a rolling code associated with the device identification, to the external device upon detecting contact. In this way, a wearable device can forgo providing a unique identifier prior to active hand contact, and thereby avoid proximity alone enabling communication between the wearable device and the external device or before unlocking the external device. In some examples, an external device can transmit device identification, including a rolling code associated with the device identification, to the wearable device upon detecting contact. In some examples, no contact detection is required, and respective devices can continuously stream respective rolling device identification codes. In some examples, an active hand touching an external device can trigger a communication session between devices. For example, a wearable device detecting an active touch event between the user's active hand and an external device can trigger wireless communication between the two devices (e.g., Bluetooth (low-energy), ZigBee, NFC protocols, etc.). In some examples, touching an external device can trigger authentication and/or login of one or more credentials. For example, a user having a wearable device can touch a remote control configured to transmit one or more signals. In response to determining contact between the user's active hand and the remote control, the wearable device, remote control, and/or other devices in communication with those devices can initiate generation, decryption, encryption, and exchanges of cryptographic keys. In some examples, the operations associated with the cryptographic keys can be included within an initial communication—or within subsequent communication—between respective devices at the beginning or during communication initiated by an active touch event. Such interactions can enroll the user with the remote device or load user settings associated with the remote device. In some examples, a wearable device can be configured to perform similar identification and initiate sequences or sessions with exercise equipment. For example, the user can automatically register their wearable device with exercise equipment transmitting one or more signals. Additionally, the active touch event can cause credentials associated with the user to be entered automatically, or after receiving interaction with a user prompt, into the exercise equipment. In some examples, workout sequences can be initiated at the wearable device in response to detecting information from exercise equipment (e.g. an equipment key frequency signature). The user touch can also initiate credential login and user profile switching at electronic devices (e.g., computing devices including computers, mobile devices, wearable devices, media consumption devices, or other embedded devices). In some examples, user touch can be used to securely unlock access to devices or functions. For example, a wearable device worn by the user can engage and disengage door locks only in response to the user's touch, thus preventing incidental signals or undesired users from altering a lock state of the door. In some examples, the user touch with an external device can prompt display or transmission of information. For example, the user can touch an external device to trigger informational displays (e.g., maps, descriptive information associated with a venue, restaurant menus). In some examples, the touch can trigger transmission of similar information to the wearable device, or another device associated with the user. In some examples, the user touch can trigger informational sequences (e.g., directions or instructions) that are sent to the wearable device, or another device associated with the user. In some examples, the user can touch a device of another individual to trigger exchange of data between the user's device and the device of the other individual. For example, the touch can trigger exchange of media (e.g., photos, videos, audio, contact information). In some examples, the exchange can be performed by one or both of the devices. In some examples, the exchange can be performed partially or entirely by devices in communication with the wearable device. In some examples, the wearable device and/or a device in communication with the wearable device can determine a current context of the user (e.g., in a business setting, at a recreational venue, amongst friends, colleagues, or family) and selectively exchange information. For example, the wearable device can determine that the user in a social context may desire to exchange social media information, or execute functions associated with social media. Additionally, the wearable device can determine that the touch can be associated with payment information (e.g., credit cards, driver's licenses, cryptographic currencies) based on the current context.

Therefore, according to the above, some examples of the disclosure are directed to a wearable device configured to be worn on a wrist of a user. The wearable device can comprise a housing. The wearable device can comprise a plurality of electrodes including a first electrode and a second electrode each configured to receive signals generated by an external device. The first electrode and the second electrode can be configured to contact skin of the user and the first electrode can be located closer to a hand of the user corresponding to the wrist of the user than the second electrode. The wearable device can comprise sensing circuitry coupled to the plurality of electrodes and can include one or more amplifiers. The wearable device can comprise processing circuitry coupled to the sensing circuitry. The processing circuitry can be configured to: in accordance with a determination that first criteria are satisfied, the first criteria including a first criterion that is satisfied when an amplitude of a first differential measurement using one or more of the received signals exceeds an amplitude threshold corresponding to contact between the hand and the external device and a second criterion using a phase of the first differential measurement or using a second differential measurement using one or more of the received signals, perform one or more functions, and in accordance with a determination that the first criteria are not satisfied, forgo performing the one or more functions.

Additionally or alternatively to the one or more examples disclosed above, in some examples, the first differential measurement can be of the one or more received signals between the first electrode and the second electrode. Additionally or alternatively to the one or more examples disclosed above, in some examples, the one or more amplifiers can comprise a first differential amplifier coupled to the first electrode and the second electrode. Additionally or alternatively to the one or more examples disclosed above, in some examples, the plurality of electrodes can further include a third electrode configured to receive signals generated by the external device. The first differential measurement can be of the one or more received signals between the first electrode and the third electrode and the second differential measurement can be of the one or more received signals between the second electrode and the third electrode. Additionally or alternatively to the one or more examples disclosed above, in some examples, the one or more amplifiers can include a first amplifier coupled to the first electrode and a second amplifier coupled to the second electrode. Additionally or alternatively to the one or more examples disclosed above, in some examples, the third electrode can be larger than the first electrode and/or the second electrode. Additionally or alternatively to the one or more examples disclosed above, in some examples, the third electrode can comprise a different material than the first electrode or the second electrode. Additionally or alternatively to the one or more examples disclosed above, in some examples, the at least a portion of third electrode can be located between the first electrode and the second electrode or partially surround the first electrode and the second electrode. Additionally or alternatively to the one or more examples disclosed above, in some examples, the first amplifier can be a differential amplifier and the second amplifier can be a differential amplifier. Additionally or alternatively to the one or more examples disclosed above, in some examples, the processing circuitry can be further configured to: determine the phase of the first differential measurement based on one or more times of transmission associated with the received signals generated by the external device. Additionally or alternatively to the one or more examples disclosed above, in some examples, the processing circuitry can be further configured to: determine a rising edge of the first differential measurement to determine the phase of the first differential measurement. Additionally or alternatively to the one or more examples disclosed above, in some examples, the processing circuitry can be further configured to: determine a falling edge of the first differential measurement to determine the phase of the first differential measurement. Additionally or alternatively to the one or more examples disclosed above, in some examples, the signals generated by the external device can comprise a periodic burst waveform followed by one or more impulses. Additionally or alternatively to the one or more examples disclosed above, in some examples, the first differential measurement can be generated during a first time period. The second differential measurement can be generated during a second time period. The processing circuitry can be further configured to: determine a start time of the second time period based on the first differential measurement. Additionally or alternatively to the one or more examples disclosed above, in some examples, the first criteria can include a third criterion that is satisfied when an average of the first differential measurement and an amplitude of a third differential measurement using one or more of the received signals exceeds a threshold value. Additionally or alternatively to the one or more examples disclosed above, in some examples, the processing circuitry can be configured to: filter the first differential measurement using a Goertzel algorithm. Additionally or alternatively to the one or more examples disclosed above, in some examples, the processing circuitry can be configured to: demodulate the first differential measurement, and extract timing information encoded in the first differential measurement. Additionally or alternatively to the one or more examples disclosed above, in some examples, the wearable device can further comprise one or more sensors. The first criteria can include a fourth criterion that is satisfied using information received via the one or more sensors indicates a touch event.

Some examples of the disclosure are directed to a method. The method can comprise, at an electronic device including a housing, a plurality of electrodes including a first electrode and a second electrode, sensing circuitry, and processing circuitry: receiving signals generated by an external device; in accordance with a determination that first criteria are satisfied, the first criteria including a first criterion that is satisfied when an amplitude of a first differential measurement using one or more of the received signals exceeds an amplitude threshold corresponding to contact between a hand of a user of the electronic device and a second criterion using a phase of the first differential measurement or using a second differential measurement using one or more of the received signals, performing one or more functions, and in accordance with a determination that the first criteria are not satisfied, forgoing performing the one or more functions.

Additionally or alternatively to the one or more examples disclosed above, in some examples, the first differential measurement can be of the one or more received signals between the first electrode and the second electrode. Additionally or alternatively to the one or more examples disclosed above, in some examples, the plurality of electrodes can further include a third electrode configured to receive signals generated by the external device. The first differential measurement can be of the one or more received signals between the first electrode and the third electrode and the second differential measurement can be of the one or more received signals between the second electrode and the third electrode. Additionally or alternatively to the one or more examples disclosed above, in some examples, the method can comprise: determining the phase of the first differential measurement based on one or more times of transmission associated with the received signals generated by the external device. Additionally or alternatively to the one or more examples disclosed above, in some examples, the method can comprise determining a rising edge of the first differential measurement to determine the phase of the first differential measurement. Additionally or alternatively to the one or more examples disclosed above, in some examples, the method can further comprise: determining a falling edge of the first differential measurement to determine the phase of the first differential measurement. Additionally or alternatively to the one or more examples disclosed above, in some examples, the signals generated by the external device can comprise a periodic burst waveform followed by one or more impulses. Additionally or alternatively to the one or more examples disclosed above, in some examples, the first differential measurement can be generated during a first time period. The second differential measurement can be generated during a second time period, and the method can further comprise: determining a start time of the second time period based on the first differential measurement. Additionally or alternatively to the one or more examples disclosed above, in some examples, the first criteria can include a third criterion that is satisfied when an average of the first differential measurement and an amplitude of a third differential measurement using one or more of the received signals exceeds a threshold value. Additionally or alternatively to the one or more examples disclosed above, in some examples, the method can further comprise: filtering the first differential measurement using a Goertzel algorithm. Additionally or alternatively to the one or more examples disclosed above, in some examples, the method can further comprise: demodulating the first differential measurement, and extracting timing information encoded in the first differential measurement. Additionally or alternatively to the one or more examples disclosed above, in some examples, the device can further comprise one or more sensors, and the first criteria can include a fourth criterion that is satisfied using information received via the one or more sensors indicative of a touch event.

Some examples of the disclosure are directed to a non-transitory computer readable storage medium. The non-transitory computer readable storage medium can store one or more programs. The one or more programs can comprise instructions, which when executed by one or more processors of a device, cause the device to perform any of the methods described herein.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A wearable device configured to be worn on a wrist of a user, comprising:
a housing;
a plurality of electrodes including a first electrode and a second electrode each configured to receive signals generated by an external device, wherein the first electrode and the second electrode are configured to contact skin of the user and the first electrode is located closer to a hand of the user corresponding to the wrist of the user than the second electrode;
sensing circuitry coupled to the plurality of electrodes including one or more amplifiers; and
processing circuitry coupled to the sensing circuitry, wherein the processing circuitry is configured to:
in accordance with a determination that first criteria are satisfied, the first criteria including a first criterion that is satisfied when an amplitude of a first differential measurement using one or more of the received signals exceeds an amplitude threshold corresponding to contact between the hand and the external device and a second criterion using a phase of the first differential measurement or using a second differential measurement using one or more of the received signals, perform one or more functions; and
in accordance with a determination that the first criteria are not satisfied, forgo performing the one or more functions.

2. The wearable device of claim 1, wherein the first differential measurement is of the one or more received signals between the first electrode and the second electrode.

3. The wearable device of claim 1, wherein the one or more amplifiers comprises a first differential amplifier coupled to the first electrode and the second electrode.

4. The wearable device of claim 1, wherein the plurality of electrodes further includes a third electrode configured to receive signals generated by the external device, wherein the first differential measurement is of the one or more received signals between the first electrode and the third electrode and the second differential measurement is of the one or more received signals between the second electrode and the third electrode.

5. The wearable device of claim 4, wherein the one or more amplifiers includes a first amplifier coupled to the first electrode and a second amplifier coupled to the second electrode.

6. The wearable device of claim 4, wherein the third electrode is larger than the first electrode or the second electrode.

7. The wearable device of claim 4, wherein the third electrode comprises a different material than the first electrode or the second electrode.

8. The wearable device of claim 4, wherein at least a portion of the third electrode is located between the first electrode and the second electrode or partially surrounds the first electrode and the second electrode.

9. The wearable device of claim 1, wherein processing circuitry is further configured to:
determine the phase of the first differential measurement based on one or more times of transmission associated with the received signals generated by the external device.

10. The wearable device of claim 1, wherein the processing circuitry is further configured to:
determine a rising edge of the first differential measurement to determine the phase of the first differential measurement.

11. The wearable device of claim 1, wherein the processing circuitry is further configured to:
determine a falling edge of the first differential measurement to determine the phase of the first differential measurement.

12. The wearable device of claim 1, wherein the signals generated by the external device comprises a periodic burst waveform followed by one or more impulses.

13. The wearable device of claim 1, wherein the first differential measurement is generated during a first time period, wherein the second differential measurement is generated during a second time period, and wherein the processing circuitry is further configured to:
determine a start time of the second time period based on the first differential measurement.

14. The wearable device of claim 1, wherein the first criteria include a third criterion that is satisfied when an average of the first differential measurement and an amplitude of a third differential measurement using one or more of the received signals exceeds a threshold value.

15. The wearable device of claim 1, wherein the processing circuitry is configured to:
demodulate the first differential measurement; and
extract timing information encoded in the first differential measurement.

16. The wearable device of claim 1, further comprising:
one or more sensors;
wherein the first criteria include a fourth criterion that is satisfied using information received via the one or more sensors indicative of a touch event.

17. A method comprising:
at an electronic device including a housing, a plurality of electrodes including a first electrode and a second electrode, sensing circuitry, and processing circuitry:
receiving signals generated by an external device;
in accordance with a determination that first criteria are satisfied, the first criteria including a first criterion that is satisfied when an amplitude of a first differential measurement using one or more of the received signals exceeds an amplitude threshold corresponding to contact between a hand of a user of the electronic device and the external device and a second criterion using a phase of the first differential measurement or using a second differential measurement using one or more of the received signals, performing one or more functions; and
in accordance with a determination that the first criteria are not satisfied, forgoing performing the one or more functions.

18. The method of claim 17, wherein the plurality of electrodes further includes a third electrode configured to receive signals generated by the external device, wherein the first differential measurement is of the one or more received signals between the first electrode and the third electrode and the second differential measurement is of the one or more received signals between the second electrode and the third electrode.

19. A non-transitory computer readable storage medium storing one or more programs, the one or more programs comprising instructions, which when executed by one or more processors of a wearable device configured to be worn on a wrist of a user, wherein the wearable device comprises a housing, a plurality of electrodes including a first electrode and a second electrode each configured to receive signals generated by an external device, wherein the first electrode and the second electrode are configured to contact skin of the user and the first electrode is located closer to a hand of the user corresponding to the wrist of the user than the second electrode, the wearable device further comprising sensing circuitry coupled to the plurality of electrodes including one or more amplifiers, cause the wearable device to:

in accordance with a determination that first criteria are satisfied, the first criteria including a first criterion that is satisfied when an amplitude of a first differential measurement using one or more of the received signals exceeds an amplitude threshold corresponding to contact between the hand of the user of the wearable device and the external device and a second criterion using a phase of the first differential measurement or using a second differential measurement using one or more of the received signals, perform one or more functions; and in accordance with a determination that the first criteria are not satisfied, forgo performing the one or more functions.

20. The non-transitory computer readable storage medium of claim 19, wherein the plurality of electrodes further includes a third electrode configured to receive signals generated by the external device, wherein the first differential measurement is of the one or more received signals between the first electrode and the third electrode and the second differential measurement is of the one or more received signals between the second electrode and the third electrode.

* * * * *